US010602554B2

(12) United States Patent
Wänstedt et al.

(10) Patent No.: US 10,602,554 B2
(45) Date of Patent: Mar. 24, 2020

(54) METHOD AND WIRELESS DEVICE FOR MANAGING RESOURCES FOR D2D COMMUNICATION

(71) Applicant: Telefonaktiebolaget L M Ericsson (publ), Stockholm (SE)

(72) Inventors: Stefan Wänstedt, Luleå (SE); Qianxi Lu, Beijing (CN); Stefan Parkvall, Stockholm (SE); Stefano Sorrentino, Solna (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 897 days.

(21) Appl. No.: 14/114,758

(22) PCT Filed: Aug. 22, 2013

(86) PCT No.: PCT/SE2013/050989
§ 371 (c)(1),
(2) Date: Oct. 30, 2013

(87) PCT Pub. No.: WO2014/168536
PCT Pub. Date: Oct. 16, 2014

(65) Prior Publication Data
US 2014/0307642 A1 Oct. 16, 2014

Related U.S. Application Data

(60) Provisional application No. 61/810,288, filed on Apr. 10, 2013.

(51) Int. Cl.
H04L 5/00 (2006.01)
H04W 76/14 (2018.01)
(Continued)

(52) U.S. Cl.
CPC .......... *H04W 76/14* (2018.02); *H04L 5/0044* (2013.01); *H04L 5/0066* (2013.01);
(Continued)

(58) Field of Classification Search
CPC .......... H04W 76/023; H04W 72/1289; H04W 76/14; H04W 28/26; H04L 5/0044;
(Continued)

(56) References Cited

U.S. PATENT DOCUMENTS 9,155,115 B2 * 10/2015 Lim ..................... H04W 76/11
9,185,690 B2 * 11/2015 Khoshnevis ........ H04W 72/042
(Continued)

FOREIGN PATENT DOCUMENTS

WO WO 2012019349 A1 * 2/2012 .......... H04W 72/082
WO WO 2012035367 A1 * 3/2012

OTHER PUBLICATIONS

Chen et al., "Time Hopping for Device-to-device Communication in LTE Cellular System", Apr. 18, 2010, WCNC 2010 proceedings, whole document.*
(Continued)

Primary Examiner — Un C Cho
Assistant Examiner — Jose L Perez
(74) Attorney, Agent, or Firm — Patent Portfolio Builders, PLLC

(57) ABSTRACT

A method and a wireless device (110) for managing a set of resources for transmission of data to a further wireless device (120) using D2D communication are disclosed. The wireless device (110) and the further wireless device (120) are capable of being operated in a mixed cellular and D2D radio network (100). The set of resources are comprised in a cellular spectrum of the mixed cellular and D2D radio network (100). The wireless device (110) selects, from among the set of resources, a sub set of resources for the
(Continued)

transmission of data according to a hopping algorithm for distribution of the sub set of resources among the set of resources. Then, the wireless device (110) sends a scheduling command to the further wireless device (120). The scheduling command indicates the selected sub set of resources. The wireless device (110) sends the data to the further wireless device (120) on the selected sub set of resources using D2D communication.

6 Claims, 5 Drawing Sheets

(51) Int. Cl.
    *H04W 72/12* (2009.01)
    *H04W 28/26* (2009.01)
(52) U.S. Cl.
    CPC ....... *H04L 5/0094* (2013.01); *H04W 72/1289* (2013.01); *H04L 5/0012* (2013.01); *H04L 5/0053* (2013.01); *H04W 28/26* (2013.01)
(58) Field of Classification Search
    CPC ..... H04L 5/0094; H04L 5/0066; H04L 5/003; H04L 5/0053; H04L 5/0012
    USPC ......................................................... 370/329
    See application file for complete search history.

(56) References Cited

U.S. PATENT DOCUMENTS

| 9,591,619 | B2* | 3/2017 | Kalhan | H04L 1/1607 |
| 9,775,135 | B2* | 9/2017 | Seo | H04W 28/06 |
| 9,883,496 | B2* | 1/2018 | Choi | H04L 5/0032 |
| 2002/0075941 | A1* | 6/2002 | Souissi | H04B 1/715 375/133 |
| 2010/0009675 | A1* | 1/2010 | Wijting | H04W 72/02 455/426.1 |
| 2012/0093098 | A1* | 4/2012 | Charbit | H04W 72/04 370/329 |
| 2013/0157656 | A1* | 6/2013 | Gao | H04W 76/023 455/434 |
| 2013/0308551 | A1* | 11/2013 | Madan | H04W 76/14 370/329 |
| 2014/0192735 | A1* | 7/2014 | Sridharan | H04W 8/26 370/329 |
| 2015/0078279 | A1* | 3/2015 | Ko | H04W 76/14 370/329 |
| 2015/0256403 | A1* | 9/2015 | Li | H04W 4/70 370/235 |
| 2015/0282208 | A1* | 10/2015 | Yi | H04W 72/121 370/329 |
| 2015/0351076 | A1* | 12/2015 | Pais | H04W 76/14 370/312 |
| 2016/0007336 | A1* | 1/2016 | Fukuta | H04W 48/12 455/426.1 |

OTHER PUBLICATIONS

Chong, WCDMA Physical Layer (Chapter 6), Nokia Research Center, (retrieved from web.archive.org/web/20060325022826/http://www.comlab.hut.fi/opetus/238/lecture6_ch6.pdf), slides 2, 9, 10.*
Fukuta et al., U.S. Appl. No. 61/766,548, filed Feb. 19, 2013, whole document.*
Sridharan et al., U.S. Appl. No. 61/751,144, filed Jan. 10, 2013, whole document (Year: 2013).*
Fukuta et al., U.S. Appl. No. 61/766,548, filed Feb. 19, 2013, whole document (Year: 2013).*

* cited by examiner

METHOD AND WIRELESS DEVICE FOR MANAGING RESOURCES FOR D2D COMMUNICATION

TECHNICAL FIELD

Embodiments herein relate to wireless communication systems, such as telecommunication systems. In particular, a method and a wireless device for managing a set of resources for transmission of data to a further wireless device using D2D communication are disclosed.

BACKGROUND

Device discovery is a well-known and widely used component of many existing wireless technologies, including ad hoc and cellular networks. Examples of technologies and/or standards, in which device discovery is used, include Bluetooth and several variants of the Institute of Electrical and Electronics Engineers (IEEE) 802.11 standards suite, such as WI-FI DIRECT® technology. These systems operate in unlicensed spectrum.

Recently, Device-to-Device (D2D) communications as an underlay to communications in a cellular network have been proposed as a means to take advantage of the proximity of communicating devices and at the same time to allow devices to operate in a controlled interference environment. Typically, such D2D communication shares the same spectrum as the cellular network. As an example, some resources of the cellular network's uplink resources may be reserved for D2D communication. Allocating a dedicated spectrum for D2D communication is a less likely alternative as spectrum is a scarce resource and dynamic sharing between services utilising D2D communication and services utilising cellular communication is more flexible. Hence, the spectrum can be more efficiently used. For D2D communication to occur, a viable solution is that terminals involved in the D2D communication have the same understanding of uplink (UL) subframe timing as the cellular network and that D2D operations primarily occur in the UL spectrum or in the UL resources of the overlying cellular system. Such a synchronized solution allows for at least partially predictable interference between D2D and cellular operations.

Cellular systems often define multiple states for the terminal matching different transmission activities. In Long Term Evolution (LTE), two states are defined:
1. RRC_IDLE, where the terminal is not connected to a particular cell and no data transfer in either uplink or downlink may occur. The terminal is in Discontinuous Reception (DRX) most of the time except for occasionally monitoring the paging channel.
2. RRC_CONNECTED, where the terminal is connected to a known cell and can receive downlink transmissions.

Although RRC_CONNECTED is not specified as having sub states in the official specifications, RRC_CONNECTED may be considered to have two sub states:
  2.1 UL_IN_SYNC, where the terminal has a valid timing advance value such that uplink transmissions can be received without collisions between different terminals
  2.2 UL_OUT_OF_SYNC, where the terminal does not have a valid timing advance value and hence cannot transmit data in the uplink. Prior to any transmission, a random access is performed to synchronize the uplink.

In LTE, random access is used to achieve uplink time synchronization for a user equipment (UE) which either has not yet acquired or has lost its uplink synchronization. Once uplink synchronization is achieved for a UE, an eNodeB (eNB) can schedule orthogonal uplink transmission resources for it.

For D2D communication, it is necessary to define the transmission and reception timing. In principle, any transmission timing could be used as long as transmissions do not interfere with cellular communication. However, an attractive approach is to use the same transmission timing at the terminal for D2D transmissions as for cellular uplink transmissions. This ensures that D2D transmissions do no collide with uplink transmissions from the same device and avoids a (potentially complicated) additional timing advance mechanism for direct D2D communication.

The term 'cellular' may in the following be extended to out-of-network coverage scenario, where the terminals may establish a hierarchical structure consisting of a cluster head (CH) and slaves controlled by the CH. In this way, the CH in many respects behaves similar to an eNB and the concept of 'cluster' can be seen as the 'cell' in a traditional cellular network. Hence, in the following text, the term 'cellular' can be also applied to the hierarchical structure of CH/Slaves.

When considering the out-of-coverage scenario in more detail, no assistance can be expected from the eNB. Hence, if a first user equipment has data to send to a second user equipment, and possibly other user equipments, a D2D communication needs to be performed for sending of the data. A possible way of triggering such D2D communication is that the first user equipment broadcasts a preamble, or beacon, that points to some fixed resources, which are to be used when sending the data. The fixed resources are statically defined by e.g. a standard specification. In this manner, resources for data may be provided while still keeping control signalling from e.g. a cluster head low. When many user equipments attempt to send data at the same time on these fixed resources, a problem may be that interference from the respective transmissions of data makes it difficult for, e.g. the second user equipment to decode the transmission and thereby obtain the data.

SUMMARY

An object is to avoid, or at least reduce, interference during D2D communication. In particular, an object may be to reduce interference during broadcast of data in D2D communication, for example without network-assistance.

According to an aspect, the object is achieved by a method, performed by a wireless device, for managing a set of resources for transmission of data to a further wireless device using D2D communication. The wireless device and the further wireless device are capable of being operated in a mixed cellular and D2D radio network. The set of resources are comprised in a cellular spectrum of the mixed cellular and D2D radio network. The wireless device selects, from among the set of resources, a subset of resources for the transmission of data according to a hopping algorithm for distribution of the subset of resources among the set of resources. Then, the wireless device sends a scheduling command to the further wireless device. The scheduling command indicates the selected subset of resources. Moreover, the wireless device sends the data to the further wireless device on the selected subset of resources using D2D communication.

According to another aspect, the object is achieved by a wireless device configured to manage a set of resources for transmission of data to a further wireless device using D2D communication. The wireless device and the further wireless device are capable of being operated in a mixed cellular and D2D radio network. The set of resources are comprised in a cellular spectrum of the mixed cellular and D2D radio network. The wireless device comprises a processing circuit configured to select, from among the set of resources, a subset of resources for the transmission of data according to a hopping algorithm for distribution of the subset of resources among the set of resources. The processing circuit is configured to send a scheduling command to the further wireless device. The scheduling command indicates the selected subset of resources. Moreover, the processing circuit is configured to send the data to the further wireless device on the selected subset of resources using D2D communication.

Since the wireless device has freedom to select the subset of resources for the data autonomously, there is a need for the wireless device to indicate the selected subset of resources to the further wireless device. Therefore, the further wireless device is made aware of the location of the subset of resources by the scheduling command which has been broadcast by the wireless device initiating the transmission of data.

Moreover, when the wireless device autonomously selects the subset of resources a hopping algorithm is used. Hence, the subset of resources for the data are at least pseudo-randomly distributed in the set of resources. In this manner, interference may be reduced thanks to time and/or frequency diversity for data transmitted by wireless devices in the D2D radio network. As a result, the above mentioned object is achieved.

Advantageously, the subset of resources are allocated, or distributed, among the set of resources for D2D communication in such a manner that interference may be reduced even when many wireless devices attempt to send data at the same time.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
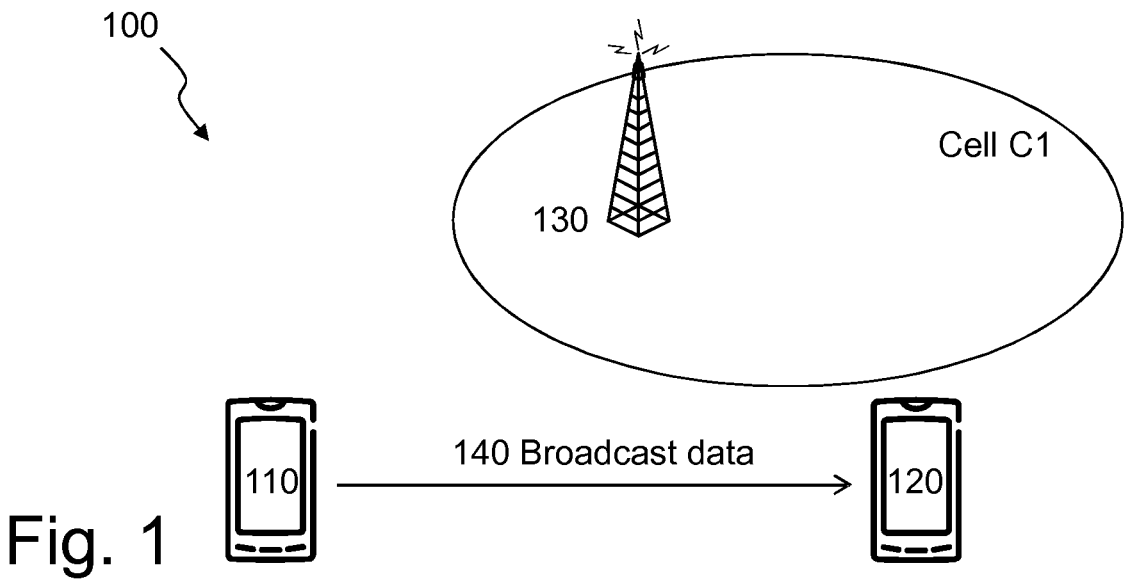
FIG. 1 shows a schematic overview of an exemplifying mixed cellular and D2D radio network in which exemplifying methods according embodiments herein may be implemented.

Throughout the following description similar reference numerals have been used to denote similar elements, network nodes, parts, items or features, when applicable.

FIG. 1 depicts an exemplifying mixed cellular and D2D radio network 100 in which embodiments herein may be implemented. As used herein, the term "mixed cellular and D2D radio network" shall be understood to mean that D2D communication is an underlay to communication in a cellular radio network as described in the background section. In this example, the radio network 100 is a Long Term Evolution (LTE) system. In other examples, the radio network 100 may be any Third Generation Partnership Project (3GPP) cellular communication system, such as a Wideband Code Division Multiple Access (WCDMA) network, a Global System for Mobile communication (GSM network), an evolution of any one of the above mentioned systems or the like. As an example, the radio network 100 may be a radio communication system 100.

The radio network 100 comprises a radio network node 130. As used herein, the term "radio network node" may refer to an evolved Node B (eNB), a control node controlling one or more Remote Radio Units (RRUs), a radio base station, an access point or the like. The radio network node 130 may be configured to operate over a so called system bandwidth. A portion of the system bandwidth may be reserved, statically or dynamically, for D2D communication.

The radio network node 130 may operate a cell C1. More generally, the cell C1 may be comprised in the radio communication system 100.

Furthermore, a wireless device 110 may be located outside the cell C1. As used herein, the term "wireless device" may refer to a user equipment (UE), a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity, etc. As further examples, the sensor may be a light sensor, an electronic switch, a microphone, a loudspeaker, a camera sensor, etc.

In other examples, the wireless device 110 may be located inside the cell C1, i.e. in range for communication with the radio network node 130.

Moreover, a further wireless device 120 may be in range for D2D communication with the wireless device 110. The further wireless device 120 may or may not be located inside the cell C1.

The wireless device 110 may send 140 broadcast data, or any other kind of information e.g. uni-cast data, to the further wireless device 120. In the following scenario, it is described how resources may be allocated before the broadcast data, or uni-cast/group-cast data, is sent to e.g. the further wireless device 120.

In the absence of cellular connection, i.e. the wireless device 110 is in RRC_IDLE or out of coverage, the wireless device 110 may perform D2D discovery and/or D2D communication, on some reserved resources. These reserved resources, or shared resources, may be reserved in time and/or frequency. This means that the reserved resources may be used for cellular communication when not occupied for D2D discovery and/or D2D communication. Thanks to the reserved resources, overhead for control signalling is reduced. Before being able to communicate, the wireless device 110 and the further wireless device 120 needs to synchronize, i.e. establish correct timing, agree on what resources to use for D2D communication, as well as exchanging other relevant information. In case there is no cellular connection, the above mentioned exchange is performed by broadcasting relevant information e.g. by sending of beacon signals.

If multiple wireless devices broadcast simultaneously and resources for broadcast are predefined, interference could prevent some wireless devices to hear any of the broadcast messages. This would render the planned data communication impossible for those wireless devices.

As used herein, the term "system bandwidth" refers to a cellular spectrum of the radio network 100. The cellular spectrum comprises radio resources, or resources for short.

As used herein, the term "D2D bandwidth" refers to a portion (or the whole) of the system bandwidth that is used for D2D communication. The D2D bandwidth may be defined in time and/or frequency.

As used herein, the term "group" or "group of resources" refers to portions of the D2D bandwidth. Typically, the groups are defined in frequency domain only.

As used herein, the term "sub channel" refers to fractions of the system bandwidth. Typically, the sub channels are defined in frequency domain only.

Figure 2:
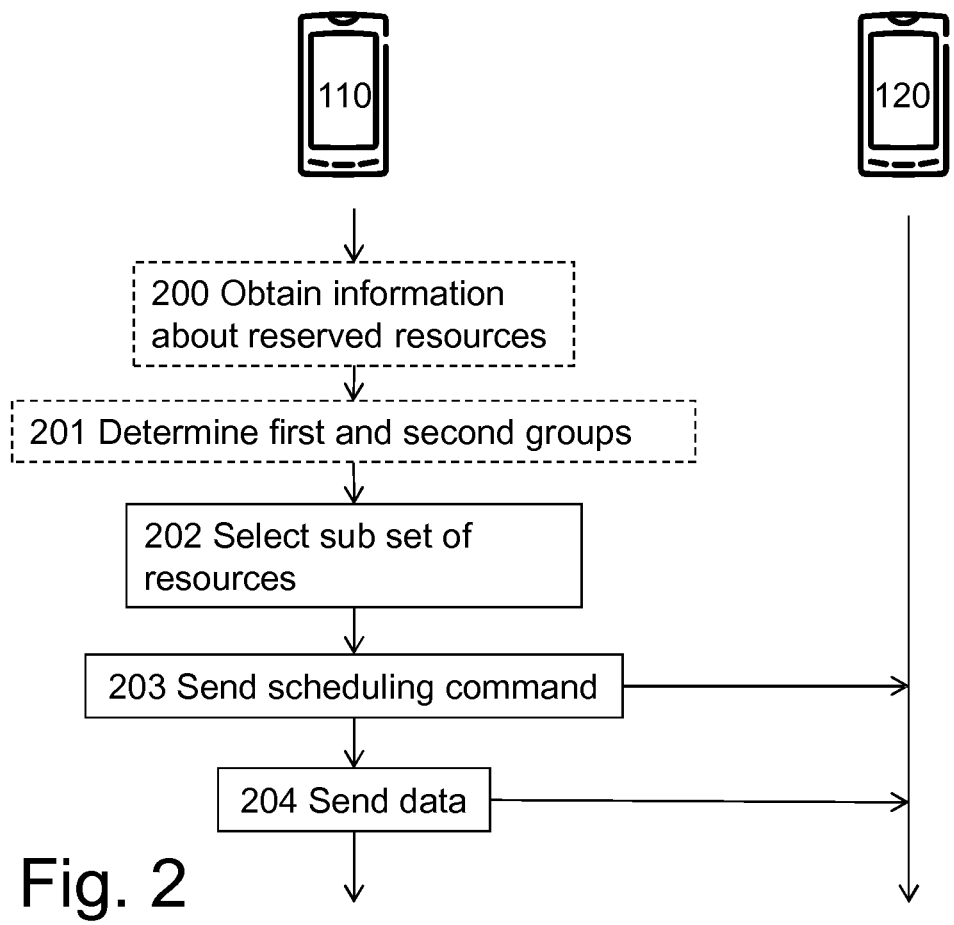
FIG. 2 is a schematic combined signaling and flow chart illustrating an exemplifying method in the radio network of FIG. 1.

FIG. 2 illustrates an exemplifying method for managing a set of resources for transmission of data between the wireless device 110 and the further wireless device 120 when implemented in the radio network 100 of FIG. 1. In this method, the wireless device 110 has determined, or detected, that the data shall be transmitted by use of D2D communication, i.e. the data shall not be transmitted via the radio network node 130. Expressed differently, the data is to be transmitted directly from, e.g., the wireless device 110 to the further wireless device 120.

As used herein, the term "D2D communication" refers to that, for example, action 204 is performed by using an underlay of the cellular part of the mixed cellular and D2D radio network 100. This is in contrast to D2D technologies such as Bluetooth, Near Field Communication (NFC) and the like. These D2D technologies do not use radio resources of the cellular spectrum and do not constitute an underlay to a cellular radio network according to a 3GPP standard specification or the like.

The wireless device 110 and the further wireless device 120 are capable of being operated in the mixed cellular and D2D radio network 100. The set of resources are comprised in a cellular spectrum of the mixed cellular and D2D radio network 100.

As used herein, the term "resource" may refer to a certain coding of a signal and/or a time frame and/or a frequency range in which the signal is transmitted. In some examples, a resource may refer to one or more physical resource blocks (PRB) which are used when transmitting the signal. In more detail, a PRB may be in the form of Orthogonal Frequency Division Multiplexing (OFDM) physical resource blocks (PRB). The term "physical resource block" is known from 3GPP terminology relating to e.g. Long Term Evolution Systems.

The following actions may be performed in any suitable order.

Action 200

The wireless device 110 may obtain information about a reserved bandwidth, e.g. the set of resources. The bandwidth may be reserved for transmission of broadcast data for D2D communication. In some examples, the reserved bandwidth is pre-configured, such as by a standard specification. Alternatively or additionally, the reserved bandwidth may be signaled from the radio network node 130 to the wireless device 110. In case the reserved bandwidth is signaled from the radio network node 130, information about the reserved bandwidth may be broadcast in a System Information Block (SIB). The information about the reserved bandwidth may also be obtained through Radio Resource Control (RRC) configuration.

Hence, in some examples, the resources for D2D broadcast data may be a certain sub-band or sub-channel, which may have been reserved by pre-configuration or a network signaling from the mixed cellular and D2D radio network 100.

Action 201

In order to find resources that may be less occupied, e.g. loaded by data and/or interference, the set of resources may be divided into a first group of resources and a second group of resources. The wireless device 110 may then evaluate which of these groups is the less loaded.

Hence, in some embodiments, the wireless device 110 may determine that the first group of resources is less occupied compared to the second group of resources. Expressed differently, the wireless device 110 may determine the first group of resources to be less occupied than the second group of resources.

As an example, the wireless device 110 may determine which of the first and second groups is less occupied by detecting energy received at the first and second groups of resources. When energy is detected at the first and second group of resources, any radio load on these resources may be detected, i.e. interference as well as signalling is taken into account.

Action 202

In order to assign, or allocate, resources for the data to be sent in action 204, the wireless device 110 selects, from among the set of resources, a subset of resources for the transmission of data according to a hopping algorithm for distribution of the subset of resources among the set of resources.

In some examples when action 201 has been performed, the wireless device 110 may select the subset of resources from among the first group of resources according to the hopping algorithm. Since the first group of resources was determined to be less occupied e.g. in terms of interference, interference towards the selected subset of resources is expected to be lower than interference in case the selected subset of resources was selected from among the second group of resources.

As an alternative or addition to action 201, the wireless device 110 may determine which of the first and second groups is less occupied by detecting respective hopping algorithms from any existing transmissions in the first and second groups of resources. Any existing transmissions may preferably be data transmission. However, any existing transmissions may in some examples be transmission of beacons.

In more detail, e.g. when a first hopping algorithm has been detected for the first group, a first amount of resources is used with the first hopping algorithm. As an example, 10 resources may be used with the first hopping algorithm. Similarly, when a second hopping algorithm has been detected for the second group, a second amount of resources is used with the second hopping algorithm. As an example, 14 resources may be used with the second hopping algorithm. Consequently, if the first amount of resources is less than the second amount of resources, the first group is less occupied. Using the examples given, the first group is less occupied if it is assumed that the first and second groups comprise the same amount of resources. As an example, the first group may comprise 20 resources and the second group may also comprise 20 resources, which however are different from the 20 resources in the first group. Notably, in other examples, the first and second groups comprise different amounts of resources. Then, the less occupied group may be defined by number of resources not used by hopping algorithm, i.e. an absolute measure, or by percentage of resources not used by hopping algorithm, i.e. a relative measure.

Hence in action 202, the data code-words, such as D2D broadcast data or D2D uni-cast data, are mapped within the whole or a group (subset) of the set of resources, which are reserved for scheduling command and broadcast data, and can be distributed in time and frequency and coding domain in a hopping manner for randomization of interference caused by these D2D broadcast data.

When the set of resources for D2D broadcast is large enough, it is possible that some traffic types, e.g., voice, only need to occupy a subset of the whole bandwidth. In this context, a 'large enough' bandwidth may have a width of 10 MHz, 20 MHz or other suitable value. In this case, as in action 201, the reserved resources can be further divided into multiple 'groups' for access by devices. Similarly, this grouping scheme can be pre-configured or indicated by network signaling. Use of groups is helpful to distribute the traffic in frequency domain, so that there would be a smaller collision probability in each group.

The hopping algorithm, or pattern, hops between sub-channels that span the whole bandwidth for D2D communication, such as the set of resources, or a part of the bandwidth for D2D communication, i.e. some groups. Each sub-channel may be defined as a fraction of the system bandwidth. Hopping may be performed by switching the selected sub-channel within the subframe or between subframes, according to some predefined pattern.

Hopping according to the hopping algorithm in time domain may be performed with regular periodicity or according to pseudo-random time patterns. A pseudo-random time pattern may be predefined according to a numeric sequence, which may imply an irregular transmission periodicity when applied as hopping algorithm.

Action 203

The wireless device 110 sends a scheduling command to the further wireless device 120. The scheduling command indicates the selected subset of resources.

The scheduling command may indicate the selected subset of resources explicitly, i.e. the scheduling command may include a field, or several fields, indicating the selected subset of resources and/or the hopping algorithm. As an example, the field may indicate a specific group and sub-channel selection and/or hopping pattern, which is to be used by the wireless device 110, to avoid or minimize the probability or randomize the event that the allocation is overlapped by allocations of other wireless devices (not shown).

In some examples, the scheduling command may indicate the selected subset of resources implicitly. An implicit indication of the selected subset of resources may be realized by one or more of the following examples.

As a first example, a Radio Network Temporary Identity "RNTI" of the wireless device 110 may identify the selected subset of resources. Thanks to a mapping from the RNTI to the hopping algorithm, the further wireless device 120 may identify the selected subset of resources. Thus, the subset of resources, such as a group, sub-channel and/or hopping pattern, may be a function of the identity of the wireless device 110, such as the RNTI.

As a second example, a scrambling code used for the scheduling command may identify the selected subset of resources. Thanks to a mapping from the scrambling code to the hopping algorithm, the further wireless device 120 may identify the selected subset of resources.

As a third example, a resource used for sending of the scheduling command may identify the selected subset of resources. Thanks to a mapping from the resource to the hopping algorithm, the further wireless device 120 may identify the selected subset of resources. This means that the hopping algorithm may be indicated by the scheduling command's resource location. Hence, there may be a one-to-one mapping between the resources assigned for data and resources assigned for the scheduling command.

In these examples, a number of predefined hopping patterns may be known to both the wireless device 110 and the further wireless device 120. The mapping, in a respective one of the first to fourth examples above, may be preconfigured or signalled from the mixed cellular and D2D radio network 100. The mapping is known to both the wireless device 110 and the further wireless device 120.

Action 203 may be performed in a first time slot, such as a subframe.

The above manners, explicit and/or implicit manner, of indicating the selected subset of resources may be combined.

Action 204

After or in the first time slot, i.e. the same time slot as action 203, the wireless device 110 sends the data to the further wireless device 120 on the selected subset of resources using D2D communication.

In the following, the embodiments above are described in more detail. It is observed that, even though the embodiments are described in the context of broadcast and group communication, i.e. one wireless device transmitting to a plurality of wireless devices, the same or similar actions may be applied also for unicast transmission, i.e. when the transmitting wireless device, such as the wireless device 110, is targeting a single receiving wireless device, such as the further wireless device 120. The destination address of the transmission may thus either be a group address shared by multiple wireless devices or a private address associated to a single wireless device. The selection of relevant received packets may be performed at link layer (link level) or at a higher layer, for example, at L1 or L2 layers of an exemplifying LTE system.

In group communication and broadcast, interference affecting the data communication is more unpredictable compared to a unicast communication case. However, the embodiments herein may be applied to both unicast and broadcast transmissions.

Because of the distributed nature of D2D operations, it is difficult to accurately predict the interference level in time and frequency resources that is experienced by the wireless devices receiving D2D data. In particular, the interference level in time and frequency is difficult to predict for group communication where multiple wireless devices are intended to receive the same message.

Hence, there is a need to reserve resources for D2D broadcast operation for both in-network (NW) and out-of-NW scenario. A reason for this is that autonomously scheduled broadcast operations, causing transmissions, would yield an unplanned interference environment, which is hard to control by a central scheduler, such as the radio network node 130 in NW coverage and a cluster head for out of NW coverage. As an example, the cluster head may be a wireless device with some features similar to those of an eNB e.g. with respect to scheduling capabilities, resource allocation capabilities and the like. The cluster head may be seen as master device, which controls one or more other wireless devices, e.g. slave devices.

Figure 3:
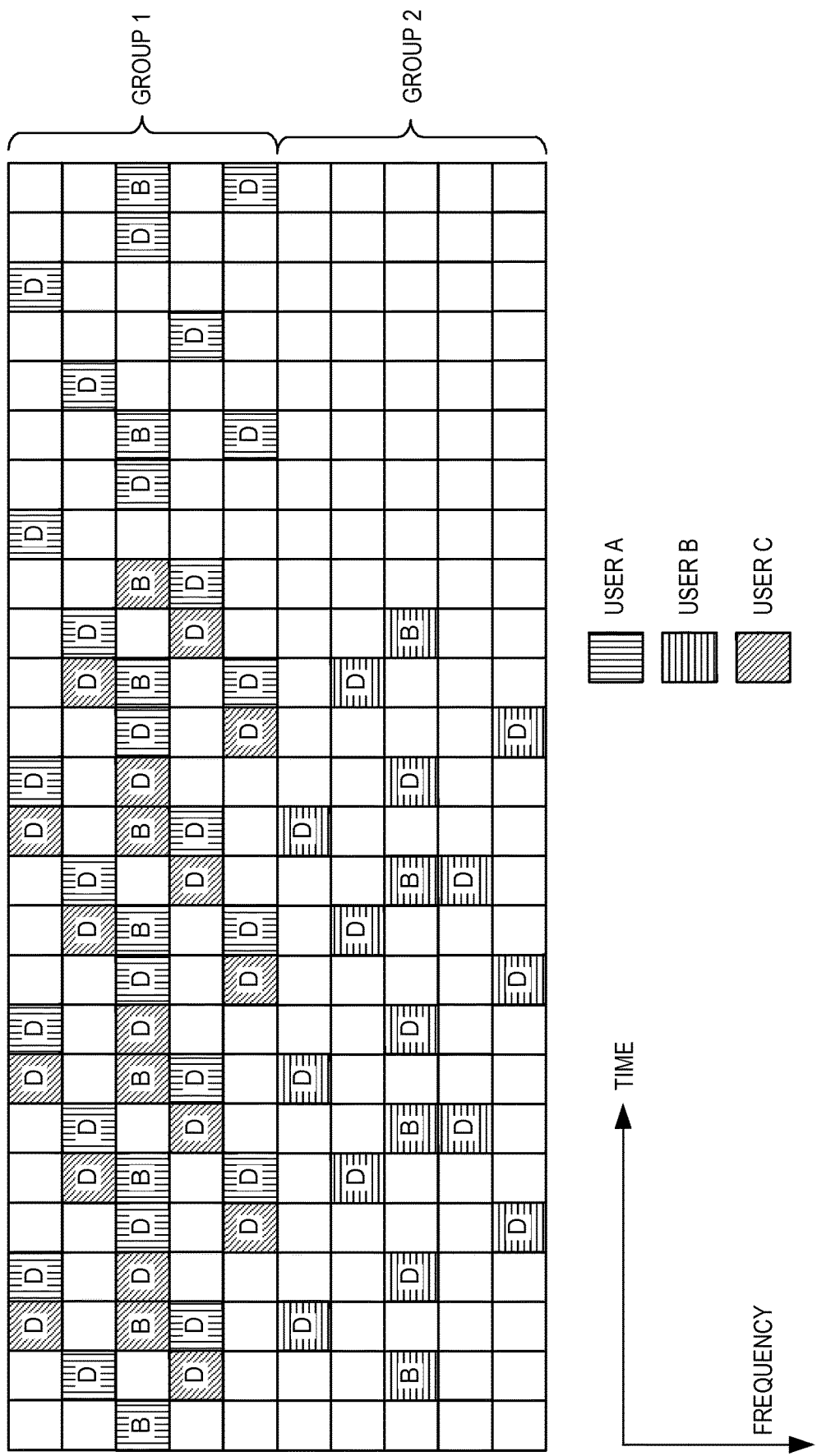
FIG. 3 is a schematic block diagram illustrating an exemplifying distribution scheme.
Figure 4:
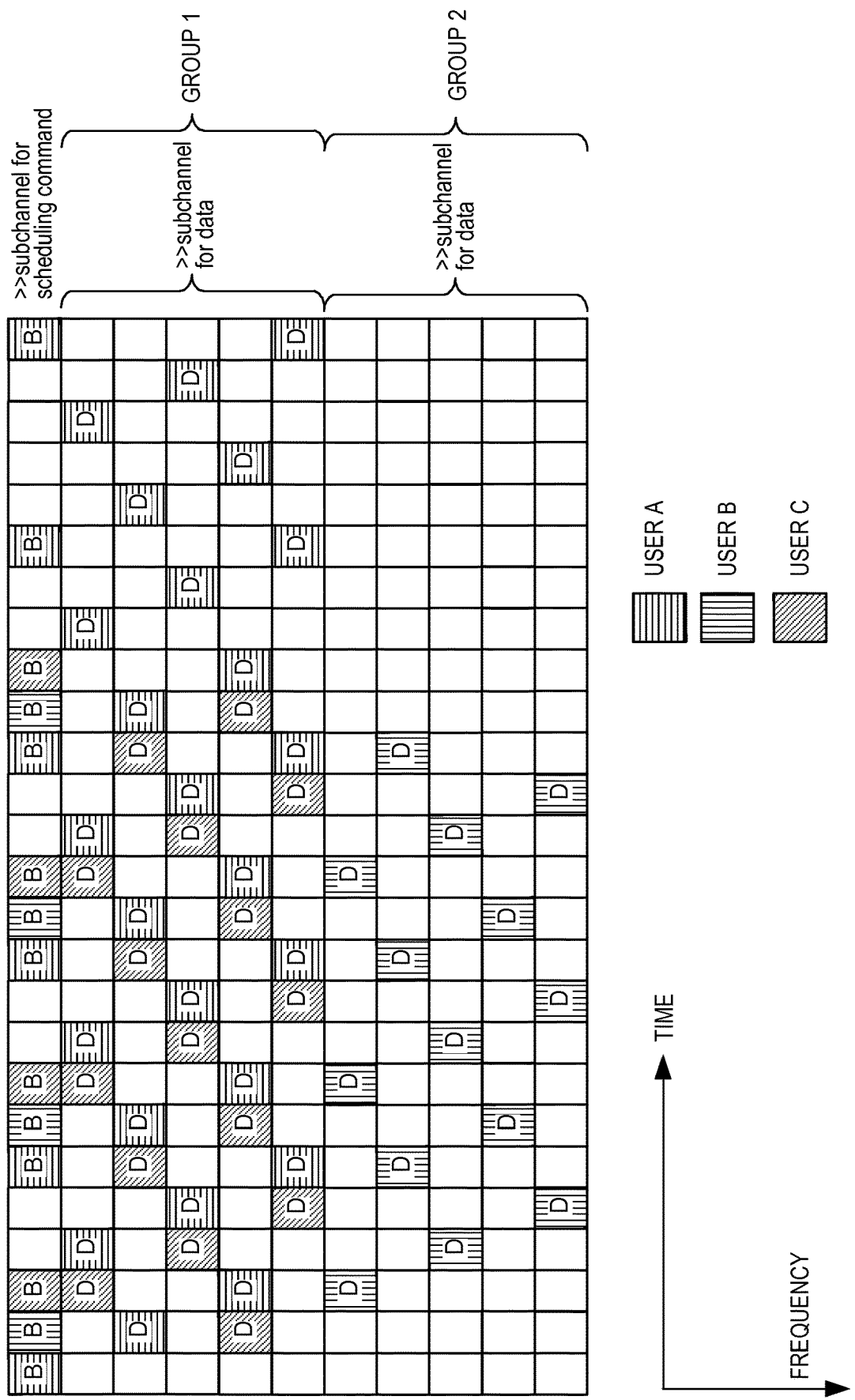
FIG. 4 is a schematic block diagram illustrating an exemplifying distribution scheme.

Examples of hopping algorithms, or hopping patterns, are shown in FIG. 3 and FIG. 4. FIG. 3 illustrates a first channel design for D2D broadcast. FIG. 4 illustrates a second channel design for D2D broadcast. In this example, the wireless device 110 is referred to as "transmitter", TX and the further wireless device 120 is referred to as "receiver", RX. In FIGS. 3 and 4, only a portion of a system bandwidth is shown. The portion is used for D2D communication. As shown in the figure a part, e.g. a sub-channel or certain subframes, of the portion is reserved for the scheduling command. In the time domain, each square, or box, may indicate a time instance, such as a sub-frame in LTE.

1) The resources are divided into 2 groups, each with 5 sub-channels. Reference is made to "Group 1" and "Group 2" in FIG. 3. Moreover, two users, user A and user C, each corresponding to a wireless device, have been assigned to resources in Group 1. A user B, also corresponding to a wireless device, has been assigned to resources in Group 2. The users may have been thus assigned according to access class, traffic type or the like.

2) The scheduling command, indicated by reference 'B', is located at the center of each group, so that the receiver may track it easily, and the data channel ('D') hops within the respective subchannel, such as Group 1 or 2.

3) As mentioned, User A and User C are located in group 1, they use different hopping patterns, of which the time/frequency location is indicated in a scheduling command from the respective user, i.e. wireless device. The scheduling command may be comprised in a beacon signal, transmitted on a beacon channel. Similarly, user B is located in group 2.

4) For each new user/device in the D2D network, the user/device may need to broadcast a beacon signal, such as the scheduling command, if the device has data to send. Then, the new device may optionally firstly select group by energy detection, e.g., find that 'group 2' has less load, and optionally also search for beacons, such as scheduling commands, of existing users. By means of the scheduling commands from existing users, the new device may be aware of the resources occupied by transmissions from the existing users. Then, the new device may send out data on resources of the selected group while at least partly avoiding the resources by transmissions from existing users.

Figure 5:
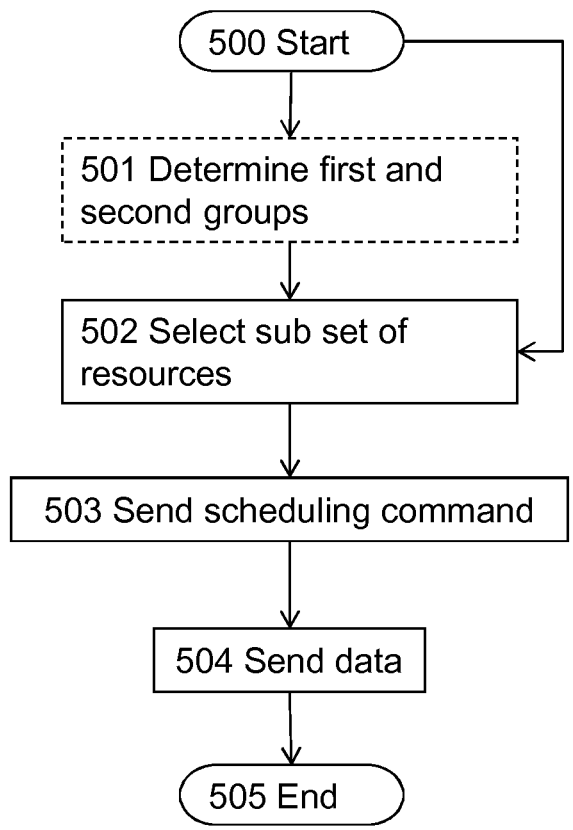
FIG. 5 is a schematic flow chart illustrating an exemplifying method in the wireless device.

In FIG. 5, an exemplifying, schematic flowchart of the method in the wireless device 110 is shown. The wireless device 110 performs a method for managing a set of resources for transmission of data to a further wireless device 120 using D2D communication.

As mentioned, the wireless device 110 and the further wireless device 120 are capable of being operated in a mixed cellular and D2D radio network 100. The set of resources is comprised in a cellular spectrum of the mixed cellular and D2D radio network 100. Again, the D2D communication may be an underlay to the mixed cellular and D2D radio network 100.

The following actions may be performed in any suitable order.

State 500

In a start state 500, the wireless device 110 may be ordered to send data to the further wireless device 120. As an example, a user of the wireless device 110 may order to send for example a file including a picture, text, video or the like, to the further wireless device 120. Alternatively or additionally, the wireless device 110 itself may detect that some data, such as the file mentioned above, is to be transmitted to the further wireless device 120. For the purpose of obtaining resources on which the some data may be transmitted, action 502 below is performed. It shall be understood that the further wireless device 120 may represent one or more further wireless devices.

Action 501

The wireless device 110 may determine that the first group of resources is less occupied compared to the second group of resources.

As mentioned, the set of resources may comprise a first group of resources and a second group of resources. The determining may be performed by detection of energy at the first and second groups of resources and/or the determining may be performed by detecting respective hopping algorithms from any existing transmissions in the first and second groups of resources.

This action is similar to action 201.

Action 502

The wireless device 110 selects, from among the set of resources, a subset of resources for the transmission of data according to a hopping algorithm for distribution of the subset of resources among the set of resources. This action is similar to action 202.

The selecting of the subset of resources may comprise selecting the subset of resources from among the first group of resources according to the hopping algorithm.

Action 503

The wireless device 110 sends a scheduling command to the further wireless device 120. The scheduling command indicates the selected subset of resources.

This action is similar to action 203.

As mentioned, the scheduling command may indicate the selected subset of resources by means of comprising one or more of:
- a field indicating the selected subset of resources and/or the hopping algorithm;
- a Radio Network Temporary Identity "RNTI" of the wireless device 110, wherein a mapping from the RNTI to the hopping algorithm enables the further wireless device 120 to identify the selected subset of resources;
- a scrambling code used for the scheduling command, wherein a mapping from the scrambling code to the hopping algorithm enables the further wireless device 120 to identify the selected subset of resources;
- a resource used for sending the scheduling command, wherein a mapping from the resource to the hopping algorithm enables the further wireless device 120 to identify the selected subset of resources.

Action 504

The wireless device 110 sends the data to the further wireless device 120 on the selected subset of resources using D2D communication. This action is similar to action 204.

State 505

In an end state 505, the wireless device 110 may have broadcast, in action 504, some or all of the data on the selected subset of resources.

Moreover, the wireless device 110 may have detected that the data broadcast in action 504 was not successfully received by the further wireless device 120. Action 502 may then be performed again to select a new subset of resources according to another hopping algorithm, which is different from the hopping algorithm used when action 502 was performed a last time.

Figure 6:
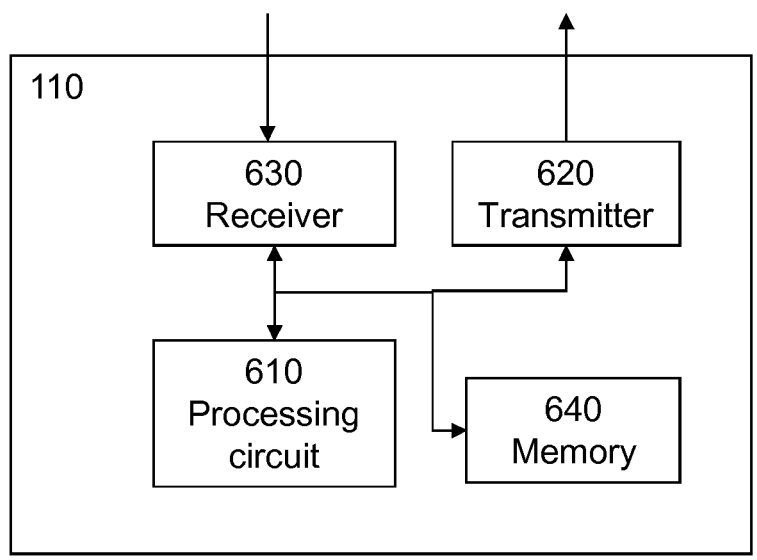
FIG. 6 is a schematic block diagram illustrating an exemplifying wireless device configured to perform the methods illustrated in FIGS. 2 and/or 5.

With reference to FIG. 6, a schematic block diagram of embodiments of the wireless device 110 is shown. The wireless device 110 is configured to perform the methods in FIGS. 2 and/or 5. Thus, the wireless device 110 is configured to manage a set of resources for transmission of data to a further wireless device 120 using D2D communication. As an example, the wireless device 110 is configured to manage resources to be allocated to broadcast data.

As mentioned, the wireless device 110 and the further wireless device 120 are capable of being operated in a mixed cellular and D2D radio network 100. The set of resources are comprised in a cellular spectrum of the mixed cellular and D2D radio network 100. Again, the D2D communication may be an underlay to the mixed cellular and D2D radio network 100.

The wireless device 110 comprises a processing circuit 610 configured to select, from among the set of resources, a subset of resources for the transmission of data according to a hopping algorithm for distribution of the subset of resources among the set of resources.

The processing circuit 610 is configured to send a scheduling command to the further wireless device 120. The scheduling command indicates the selected subset of resources. Moreover, the processing circuit 610 is configured to send the data to the further wireless device 120 on the selected subset of resources using D2D communication.

As mentioned, the scheduling command may indicate the selected subset of resources by means of comprising one or more of:
- a field indicating the selected subset of resources and/or the hopping algorithm;
- a Radio Network Temporary Identity "RNTI" of the wireless device 110, wherein a mapping from the RNTI to the hopping algorithm enables the further wireless device 120 to identify the selected subset of resources;
- a scrambling code used for the scheduling command, wherein a mapping from the scrambling code to the hopping algorithm enables the further wireless device 120 to identify the selected subset of resources; and
- a resource used for sending of the scheduling command, wherein a mapping from the resource to the hopping algorithm enables the further wireless device 120 to identify the selected subset of resources.

In some embodiments, the set of resources may comprise a first group of resources and a second group of resources. The processing circuit 610 may further be configured to determine that the first group of resources is less occupied compared to the second group of resources, and select the subset of resources from among the first group of resources according to the hopping algorithm.

As an example, the processing circuit 610 may further be configured to detect energy at the first and second groups of resources and/or detect respective hopping algorithms from any existing transmissions in the first and second groups of resources.

The processing circuit 610 may be a processing unit, a processor, an application specific integrated circuit (ASIC), a field-programmable gate array (FPGA) or the like. As an example, a processor, an ASIC, an FPGA or the like may comprise one or more processor kernels.

The wireless device 110 further comprises a transmitter 620, which may be configured to send one or more of the scheduling command, the data and other messages, values, parameters, indications or the like.

The wireless device 110 further comprises a receiver 630, which may be configured to receive for example feedback information relating to successful or non-successful transmission of the data in action 204.

The wireless device 110 further comprises a memory 640 for storing software to be executed by, for example, the processing circuit. The software may comprise instructions to enable the processing circuit to perform the method in the wireless device 110 as described above in conjunction with FIGS. 2 and/or 5. The memory may be a hard disk, a magnetic storage medium, a portable computer diskette or disc, flash memory, random access memory (RAM) or the like. Furthermore, the memory may be an internal register memory of a processor.

According to embodiments herein, there is provided a method in a wireless device for managing a plurality of resources, such as radio resources, resource blocks, sub-channels or the like, for transmission of information to a further wireless device. The plurality of resources may be reserved for D2D communication. The information may be D2D broadcast data, D2D uni-cast data, user data, payload data or the like.

The wireless device selects a set of resources from among the plurality of resources based on a scheduling command to be sent to the further wireless device.

The wireless device sends the scheduling command to the further wireless device, wherein the scheduling command indicates resources to be used for transmission of the information to the further wireless device. The scheduling command may indicate that the wireless device wishes to send the information to the further wireless device. Moreover, the scheduling command may enable synchronization between the wireless devices in order to allow the wireless device to send the information.

According to some embodiments, when a terminal, or more generally a wireless device, wishes to start Device-to-Device (D2D) communication the following may be performed in order to reduce collision/interference.

The wireless device may map the broadcast data to the whole or a part of the reserved bandwidth for device to-device communication by pre-configuration or through network signalling.

The wireless device may distribute the broadcast data within the occupied bandwidth in, e.g. time and frequency, according to some hopping algorithm.

The wireless device may obtain the specific resource location of broadcast data (including the hopping pattern) from a scheduling command broadcasted by the terminal having data to send.

This results in a coordinated and/or randomized interference for the broadcasted data. Randomized may here include pseudo-randomized selection of resources to be used for sending of broadcast data. According to embodiments herein, it is shown how the hopping pattern, etc., is selected.

Figure 7:
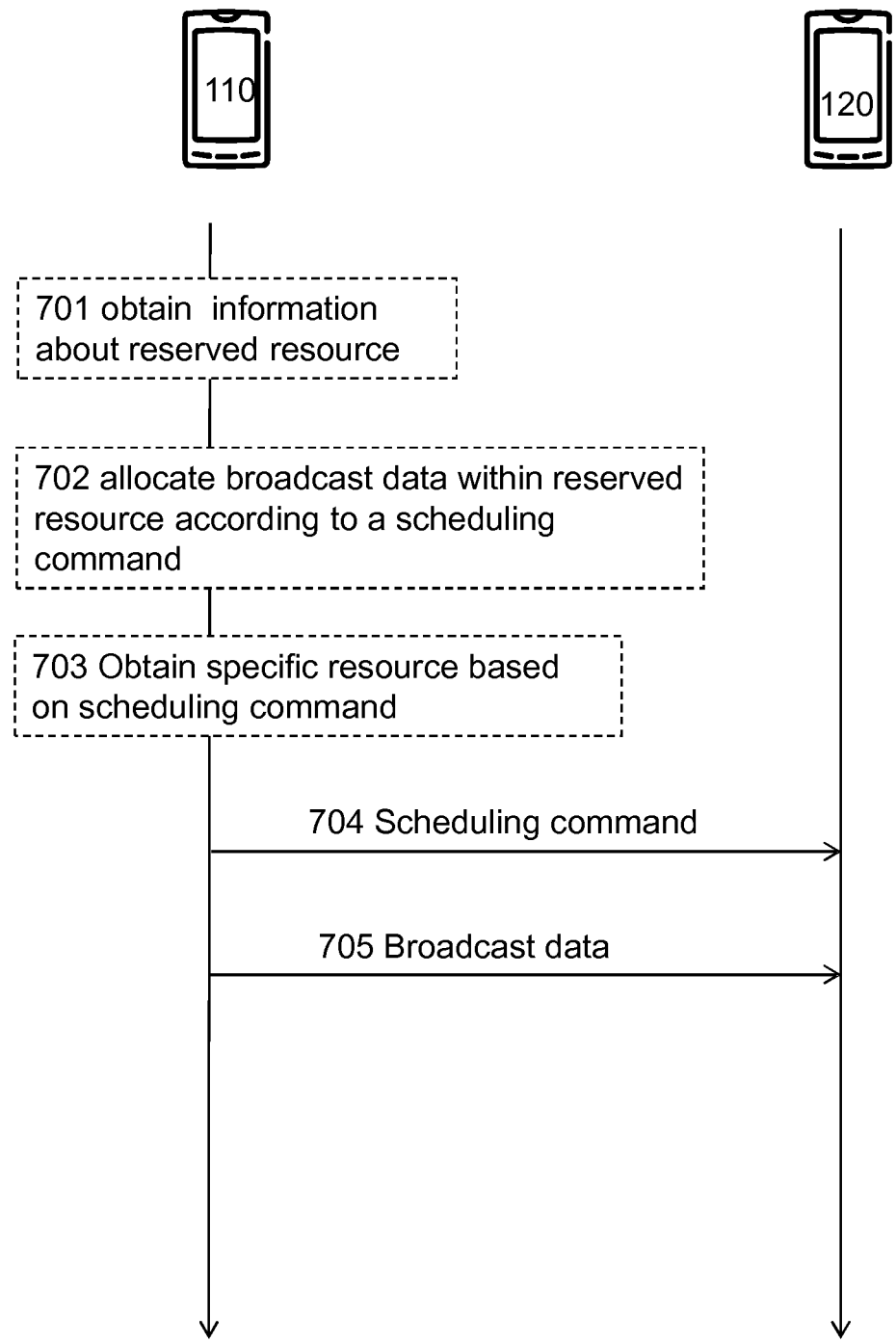
FIG. 7 is a schematic combined signaling and flow chart illustrating another exemplifying method in the radio network of FIG. 1.

FIG. 7 illustrates exemplifying methods in the wireless device 110 and the further wireless device 120 according to embodiments herein. The wireless device 110 may perform a method for managing a plurality of resources for transmission of broadcast data to a further wireless device.

The following actions may be performed in any suitable order.

Action 701

The wireless device 110 may obtain information about a reserved bandwidth. The bandwidth may be reserved for transmission of broadcast data for D2D communication, i.e. data to be broadcast using D2D communication. In some examples, the reserved bandwidth is pre-configured, such as by a standard specification. Alternatively or additionally, the reserved bandwidth may be signaled from the radio network node 110 to the wireless device 110.

Action 702

The wireless device 110 may distribute, or allocate, the broadcast data within the reserved bandwidth e.g. according to a hopping algorithm. As an example, the broadcast data may be payload data, user data or the like.

Action 703 The wireless device 110 obtains, or selects, a specific resource location based on a scheduling command to be sent to the further wireless device 120 in the action "sending of scheduling command" below. The specific resource location for the broadcast data may be selected from among the resources allocated when distributing the broadcast data within the reserved bandwidth, e.g. according to a hopping algorithm.

Any information carried by the scheduling command may be exploited to select the specific resource location and the hopping algorithm.

In addition, there may be an implicit mapping from e.g. the radio resources in time/frequency used for the scheduling command, i.e. the specific resource location is determined based on the radio resources used for carrying the scheduling command. Moreover, a scrambling code used for the scheduling command may also be linked to a specific resource location. The term scrambling code has its conventional meaning as within the field of cellular telecommunication systems, such as LTE system. As an example, the wireless device selects a set of resources based on properties derived from the scheduling command. The properties may be a scrambling code.

Action 704

This action includes sending of "Scheduling command" as shown in FIG. 7. The wireless device 110 may send a scheduling command to the further wireless device 120. The scheduling command may indicate, e.g. explicitly or implicitly, to the wireless device 110 which resources (specific resource location in action 703) are used when the wireless device 110 sends broadcast data to the further wireless device. The scheduling command may be similar to a page message, i.e. a message indicating that a receiver of the message will receive data.

Action 705

This action includes sending of "broadcast data" as shown in FIG. 7.

Now that the wireless device has selected the specific resource location for sending of the broadcast data, the wireless device 110 sends the broadcast data to the further wireless device 120. Thanks to that the wireless device 110 sent the scheduling command, the further wireless device 120 has knowledge thereof, i.e. knowledge of the scheduling command. Thus, the further wireless device 120 is able to determine when and where to expect the broadcast data to be received from the wireless device 110.

It shall be understood that the scheduling command may be sent before or simultaneously, such as in the same subframe, with some or all of the broadcast data.

As used herein, the terms "number", "value" may be any kind of digit, such as binary, real, imaginary or rational number or the like. Moreover, "number", "value" may be one or more characters, such as a letter or a string of letters. Furthermore, "number", "value" may also be represented by a bit string.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a wireless device, for managing a set of resources for transmission of data to a further wireless device using Device-to-Device (D2D) communication, wherein the wireless device and the further wireless device are configured for operation in a mixed cellular and D2D radio network, wherein the set of resources are comprised in a cellular spectrum of the mixed cellular and D2D radio network, wherein the set of resources comprises a first group of resources and a second group of resources, and wherein the method comprises:

determining that the first group of resources is less occupied compared to the second group of resources by detecting energy at the first and second groups of resources;

selecting, from among the set of resources, a subset of resources for the transmission of data according to a hopping algorithm for distribution of the subset of resources among the set of resources, wherein the selecting of the subset of resources comprises selecting the subset of resources from among the first group of resources, according to the hopping algorithm;

sending a scheduling command to the further wireless device, wherein the scheduling command indicates the selected subset of resources according to a scrambling code used for the scheduling command, wherein a mapping from the scrambling code to the hopping algorithm enables the further wireless device to identify the selected subset of resources; and sending the data to the further wireless device on the selected subset of resources using the D2D communication.

2. The method according to claim 1, wherein the determining is further performed by:

detecting respective hopping algorithms from any existing transmissions in the first and second groups of resources.

3. The method according to claim 1, wherein the D2D communication is an underlay to the mixed cellular and D2D radio network.

4. A wireless device configured to manage a set of resources for transmission of data to a further wireless device using Device-to-Device (D2D) communication, wherein the wireless device and the further wireless device are configured for operation in a mixed cellular and D2D radio network, wherein the set of resources are comprised in a cellular spectrum of the mixed cellular and D2D radio network, wherein the set of resources comprises a first group of resources and a second group of resources, and wherein the wireless device comprises a processing circuit configured to:

determine that the first group of resources is less occupied compared to the second group of resources by detection of energy at the first and second groups of resources;

select, from among the set of resources, a subset of resources for the transmission of data according to a hopping algorithm for distribution of the subset of resources among the set of resources, wherein, to select the subset of resources, the processing circuit is configured to select the subset of resources from among the first group of resources, according to the hopping algorithm;

send a scheduling command to the further wireless device, wherein the scheduling command indicates the selected subset of resources according to:

a scrambling code used for the scheduling command, wherein a mapping from the scrambling code to the hopping algorithm enables the further wireless device to identify the selected subset of resources; and send the data to the further wireless device on the selected subset of resources using the D2D communication.

5. The wireless device according to claim 4, wherein, to determine that the first group of resources is less occupied compared to the second group of resources, the processing circuit is further configured to detect:
respective hopping algorithms from any existing transmissions in the first and second groups of resources.

6. The wireless device according to claim 4, wherein the D2D communication is an underlay to the mixed cellular and D2D radio network.

* * * * *